(12) United States Patent
Connally (10) Patent No.: US 7,715,964 B1
(45) Date of Patent: May 11, 2010

(54) VERY LOW SPEED VEHICLE CONTROL ALGORITHM OPERATING IN THE SPATIAL DOMAIN

(75) Inventor: John Arnold Connally, Los Gatos, CA (US)

(73) Assignee: Trimble Navigation, Ltd., Sunnyvale, CA (US)

( * ) Notice: Subject to any disclaimer, the term of this patent is extended or adjusted under 35 U.S.C. 154(b) by 1200 days.

(21) Appl. No.: 11/126,564

(22) Filed: May 10, 2005

(51) Int. Cl.
*G06F 17/00* (2006.01)
*G06F 19/00* (2006.01)

(52) U.S. Cl. ............... 701/41; 701/42; 701/70; 701/71; 701/72; 701/73; 701/74; 701/75; 701/213; 701/300; 701/301; 180/6.5; 180/446; 318/66; 318/67; 318/433; 318/434; 318/621

(58) Field of Classification Search ............... 701/42, 701/94, 116, 205
See application file for complete search history.

(56) References Cited

U.S. PATENT DOCUMENTS

| | | | | |
|---|---|---|---|---|
| 5,253,724 A | * | 10/1993 | Prior | 180/6.5 |
| 5,473,539 A | * | 12/1995 | Shimizu et al. | 701/41 |
| 5,699,249 A | * | 12/1997 | Noro et al. | 701/42 |
| 5,979,587 A | * | 11/1999 | Liubakka et al. | 180/446 |
| 6,658,335 B2 | * | 12/2003 | Kleinau | 701/41 |
| RE38,632 E | * | 10/2004 | Schmidt et al. | 701/41 |
| 6,868,317 B2 | | 3/2005 | Okuyama | |
| 6,901,319 B1 | * | 5/2005 | Nelson et al. | 701/41 |
| 6,952,635 B2 | * | 10/2005 | Yasui et al. | 701/41 |
| 6,959,970 B2 | * | 11/2005 | Tseng | 303/146 |
| 7,267,188 B2 | * | 9/2007 | Wakitani et al. | 180/6.5 |
| 7,383,109 B2 | * | 6/2008 | Heilig et al. | 701/41 |

OTHER PUBLICATIONS

Hemami et al. "Problem Formulation for Path Tracking Automation of Low Speed Articulated Vehicles", Sep. 15-18, 1996, Proceedings of the 1996 IEEE International Conference on Control Applications, pp. 697-702.*

* cited by examiner

*Primary Examiner*—Thomas G Black
*Assistant Examiner*—Sze-Hon Kong
(74) *Attorney, Agent, or Firm*—Boris G. Tankhilevich (57) ABSTRACT

A method of operating a vehicle at a substantially low speed based on change in the vehicle position. The method comprises the following steps: (A) transforming a steering control algorithm into a substantially low speed (SLS) steering control algorithm, wherein the (SLS) steering control algorithm is configured to operate the vehicle in an asynchronous low speed mode; and (B) implementing the SLS steering control algorithm as a controller configured to operate the vehicle in the asynchronous low speed mode.

24 Claims, 4 Drawing Sheets

VERY LOW SPEED VEHICLE CONTROL ALGORITHM OPERATING IN THE SPATIAL DOMAIN

BACKGROUND OF THE INVENTION

1. Field of the Invention

The present invention is in the field of control systems, and more specifically, is in the field of very low speed vehicle control algorithms.

2. Discussion of the Prior Art

In the prior art, performance of the existing control system deteriorates at very low speeds. A very low speed operation is considered to be in the range of (0.0-1.0) mph, or (0.0-0.5) m/s, and is necessary for certain farming operations.

Performance of the existing system deteriorates at low speeds for several reasons. At first, the sensor data is limited. At speeds less than 0.5 mph RTK GPS velocity and heading become noisy and unreliable; the signal to noise ratio of yaw rate from the Inertial Measurement Unit (IMU) deteriorates, and finally at speeds less than 1 mph, the vehicle speed sensor (VSS) no longer provides useful information. A reliable estimate of vehicle speed is necessary in the existing controller because of the dual mode operation of the heading filter (clamped versus normal mode); the activation or deactivation of the steering loop, and speed related dependencies in the outer supervisor loop. Also, at very low speeds, the vehicle has a large time constant that leads to problems of integrator windup and saturation in the supervisor loop.

What is needed is to enhance the existing navigation control algorithms such that closed loop performance at low speeds is comparable to what is currently achievable at higher speeds (approx. 0.5 m/s-1 m/s).

SUMMARY OF THE INVENTION

The present invention addresses this problem by disclosing a method of operating a vehicle at a substantially low speed by using a substantially low speed (SLS) steering control algorithm.

More specifically, one aspect of the present invention is directed to a method of operating a vehicle at a substantially low speed based on change in the vehicle position.

In one embodiment of the present invention, the method comprises the following steps: (A) transforming a steering control algorithm into a substantially low speed (SLS) steering control algorithm, wherein the (SLS) steering control algorithm is configured to operate the vehicle in an asynchronous low speed mode; and (B) implementing the SLS steering control algorithm by a controller configured to operate the vehicle in the asynchronous low speed mode.

In one embodiment of the present invention, the step (A) further comprises the step (A1) of transforming a set of state equations out of the time domain into the spatial domain. In this embodiment of the present invention, a set of measured variables becomes a function of a distance traveled. In this embodiment of the present invention, the set of measured variables is selected from the group consisting of: {a heading error; a cross track error; and a distance between front and rear axles}.

In one embodiment of the present invention, the step (B) further comprises the step (B1) of executing the SLS steering control algorithm asynchronously at a fixed delta position to operate the vehicle at substantially low speed.

In one embodiment of the present invention, the step (B1) further comprises the step (B1, 1) of implementing the SLS steering control algorithm by an asynchronous variable rate controller further comprising at least two loops comprising a first loop and a second loop. In this embodiment of the present invention, the first loop comprises an inner heading loop that receives heading commands, wherein the second loop comprises an outer cross track error loop that receives external cross track error commands from an operator.

In one embodiment of the present invention, the step (B1) further comprises the step (B1, 2) of implementing the SLS steering control algorithm by an asynchronous variable rate controller for front steered wheeled vehicles. In this embodiment of the present invention, the asynchronous variable rate controller further comprises at least two loops, wherein the first loop comprises an inner heading asynchronous loop that receives heading commands, and wherein the second loop comprises an outer cross track error asynchronous loop that receives external cross track error commands from an operator.

In one embodiment of the present invention, the step (B1) further comprises the step (B1, 3) of implementing the SLS steering control algorithm by a variable rate controller for tracked vehicles. In this embodiment of the present invention, the variable rate controller comprises at least two loops, wherein the first loop comprises an inner heading synchronous loop that receives heading commands, and wherein the second loop comprises an outer cross track error asynchronous loop that receives external cross track error commands from an operator.

In one embodiment, the method of the present invention of operating a vehicle at a substantially low speed based on change in the vehicle position further comprises the step (C) of using an asynchronous observer to improve the tracking accuracy of the vehicle being controlled. In this embodiment of the present invention, the asynchronous observer is modeled according to the vehicle kinematics.

In one embodiment, the method of the present invention of operating a vehicle at a substantially low speed based on change in the vehicle position further comprises the step (D) of using position and velocity filters to substantially improve at least one parameter selected from the group consisting of: {removing noise; improving accuracy in obtained position and velocity coordinates; and smoothing out quantization effects}.

In one embodiment of the present invention, the step (D) of using position and velocity filters further comprises the step (D1) of using the position and velocity filters to assist in transitioning the controller from an asynchronous low speed mode to a synchronous mode and vice versa.

In one embodiment of the present invention, the step (D1) further comprises the step (D1, 1) of defining a transition point between the asynchronous low speed mode and the synchronous mode.

Another aspect of the present invention is directed to an apparatus for operating a vehicle at a substantially low speed based on change in the vehicle position.

In one embodiment of the present invention, the apparatus comprises: a means (A) for transforming a steering control algorithm into a substantially low speed (SLS) steering control algorithm, wherein the (SLS) steering control algorithm is configured to operate the vehicle in an asynchronous low speed mode; and a means (B) for implementing the SLS steering control algorithm by a controller configured to operate the vehicle in the asynchronous low speed mode.

In one embodiment of the present invention, the means (A) further comprises a means (A1) for transforming the set of state equations out of the time domain into the spatial domain. In this embodiment of the present invention, a set of measured variables becomes a function of a distance traveled. In this embodiment of the present invention, the set of measured variables is selected from the group consisting of: {a heading error; a cross track error; and a distance between front and rear axles}.

In one embodiment of the present invention, the means (A) further comprises a processor, and a memory block. In this embodiment of the present invention, the processor is configured to transform the set of state equations out of the time domain into the spatial domain. In this embodiment of the present invention, a set of measured variables becomes a function of a distance traveled. In this embodiment of the present invention, the set of measured variables is selected from the group consisting of: {a heading error; a cross track error; and a distance between front and rear axles}.

In one embodiment of the present invention, the means (B) further comprises a means (B1) for executing the SLS steering control algorithm asynchronously at a fixed delta position to operate the vehicle at the substantially low speed.

In one embodiment of the present invention, the means (B) further comprises a processor, and a memory block. In this embodiment of the present invention, the processor is configured to execute the SLS steering control algorithm asynchronously at a fixed delta position to operate the vehicle at the substantially low speed.

In one embodiment of the present invention, the means (B1) for executing the SLS steering control algorithm asynchronously at the fixed delta position to operate the vehicle at the substantially low speed further comprises an asynchronous variable rate controller comprising at least two loops. In this embodiment of the present invention, the first loop comprises an inner heading loop that receives heading commands, wherein the second loop comprises an outer cross track error loop that receives external cross track commands from an operator.

In one embodiment, the apparatus of the present invention for operating a vehicle at a substantially low speed based on change in the vehicle position further comprises position & velocity filters configured to substantially improve at least one parameter selected from the group consisting of: {removing noise; improving accuracy in obtained position and velocity coordinates; and smoothing out quantization effects}.

In one embodiment, the apparatus of the present invention for operating a vehicle at a substantially low speed based on change in the vehicle position further comprises an asynchronous observer configured to improve the tracking accuracy of a vehicle being controlled. In this embodiment of the present invention, the asynchronous observer is modeled according to the vehicle kinematics.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
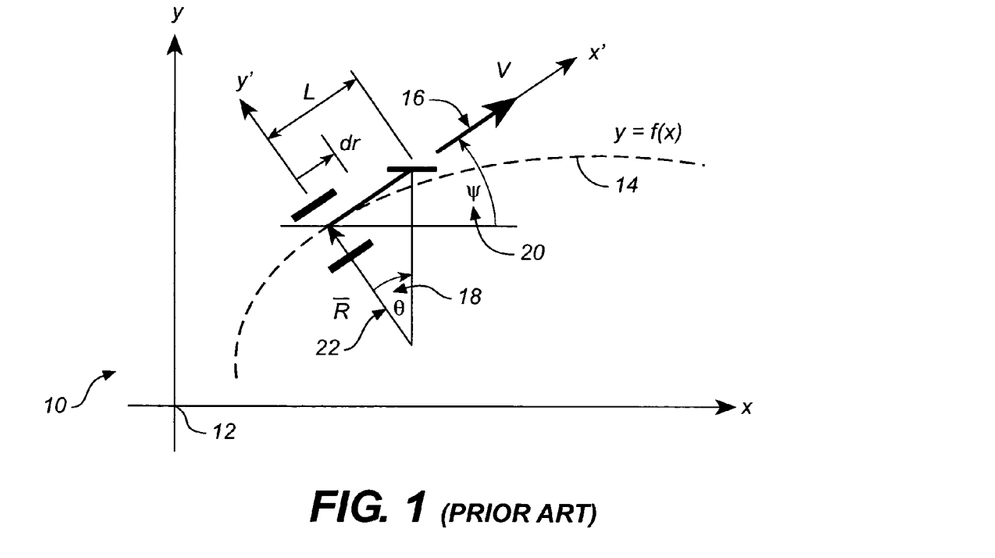
FIG. 1 is a prior art illustration of the kinematics of a three wheeled front steered vehicle traveling in an ENU (East, North, Up) local tangent plane. The origin is located at an arbitrary point given by its LLA (Latitude, Longitude, and Altitude) coordinates, whereas the x and y-axes correspond to the East and North directions and all distances are measured relative to the origin.

FIG. 1 is a prior art illustration 10 of the kinematics of a three wheeled front steered vehicle traveling in an ENU (East, North, Up) local tangent plane. The origin 12 is located at an arbitrary point given by its LLA (Latitude, Longitude, and Altitude) coordinates. In FIG. 1, the x and y-axes correspond to the East and North directions and all distances are measured relative to the origin. The dotted line 14 represents the path of the vehicle measured in terms of distance (meters). At any point on the path, the vehicle velocity, V 16, is tangent to the path and directed along the x' prime axis. The steering angle of the front wheel is given by θ 18 (the control input); heading is given by the angle ψ 20, and R 22 is the radius of curvature of the path.

Assuming that the desired path to follow lies along the x prime axis and that all angles are small, heading becomes heading error (the difference between the desired heading and actual vehicle heading), and the distance traveled along the y prime axis becomes cross track error (XTE). Dropping the prime notation, Equation 1 and Equation 2 are the kinematic equations of motion that govern the position and heading of the vehicle relative to the desired path. Equation 1 relates the change in heading to the steering angle though L, the distance between the front and rear axles. Equation 2 relates the change in XTE to heading.

$$\frac{d\psi}{dt} = \frac{V}{R} = \frac{V\tan(\theta)}{L} \qquad \text{(Eq. 1)}$$

$$\frac{dy}{dt} = V\tan(\psi) \qquad \text{(Eq. 2)}$$

Applying the small angle approximation and recasting the state equations in matrix form gives Equation 3 where the additional term, x, which represents the integral of cross track error with respect to time. The control law is full state feedback as shown in Equation 4. The feedback gains are computed using Ackerman's pole placement formula where all closed loop poles are placed at –P radians/sec (P is referred to as the "bandwidth corner"). Equation 5 is the matrix of feedback gains computed with Ackerman's formula.

$$\begin{bmatrix} \psi \\ y_{xte} \\ x \end{bmatrix} = \begin{bmatrix} 0 & 0 & 0 \\ V & 0 & 0 \\ 0 & 1 & 0 \end{bmatrix} \begin{bmatrix} \psi \\ y_{xte} \\ x \end{bmatrix} + \begin{bmatrix} V/L \\ 0 \\ 0 \end{bmatrix} \theta \quad \text{(Eq. 3)}$$

Here, $\psi$=heading error in (radians)

$y_{xte}$=cross track error (m)

V=vehicle velocity (m/s)

L=distance between front and rear axles (m)

$\theta$=command angle (radians)

x=integral of cross track error (m sec)

$$\theta(t) = -K_1\psi(t) - K_2 y_{xte}(t) - K_3 x(t) \quad \text{(Eq. 4)}$$

$$\underline{K} = [3PL/V \quad 3P^2L/V^2 \quad P^3L/V^2] \quad \text{(Eq. 5)}$$

The feedback gains are inversely related to velocity in order to maintain both stability and a uniform transient response as the vehicle velocity changes. However, this formulation is problematic as velocity approaches zero because the gains become very large which leads to actuator saturation and integrator windup. To prevent this effect, the gains are fixed by a pre-set value of velocity referred to as the "velocity corner". Below the velocity corner, the gains are constant; however, this leads to instability as velocity is further reduced.

To analyze the stability of the existing system, equivalent models of the compensator and plant are derived in the LaPlace domain and the root locus method applied. Although two state equations are used to describe the motion of the vehicle, the system is in fact SISO (single input single output). The position of a point moving in an x, y plane has in general two independent degrees of freedom (motion in the x direction and motion in the y); however, the kinematics of the vehicle constrain this motion to a single degree of freedom. Therefore, either heading is controlled or XTE, but not both simultaneously and independently.

Using XTE as the controlled variable, the control law and plant equations are recast as SISO transfer functions. Equation 6 is the transfer function of an equivalent compensator, and Equation 7 is the plant transfer function. Multiplying the two gives Equation 8, the open loop transfer function from the plant output (XTE) to controller input where k is the root locus gain that varies from zero to infinity. Note that velocity cancels out if the compensator gains are parameterized with the true vehicle velocity. If this is the case, the closed loop response and stability margins are invariant to changes in velocity, which should be the case if Ackerman's formula holds.

Compensator TF ($y_{xte\_cmd} - y_{xte} \Rightarrow \theta$):

$$K(s) = -\frac{(K_1/V)s^2 + K_2 s + K_3}{s} \quad \text{(Eq. 6)}$$

Plant TF ($\theta = > y_{xte}$):

$$G_p(s) = \frac{(V^2/L)}{s^2} \quad \text{(Eq. 7)}$$

$$G_{OL} = kL\left(\frac{P}{V}\right)^2 \left[\frac{(3/P)s^2 + 3s + P}{s}\right]\left[\frac{V^2/L}{s^2}\right] \quad \text{(Eq. 8)}$$

Figure 2:
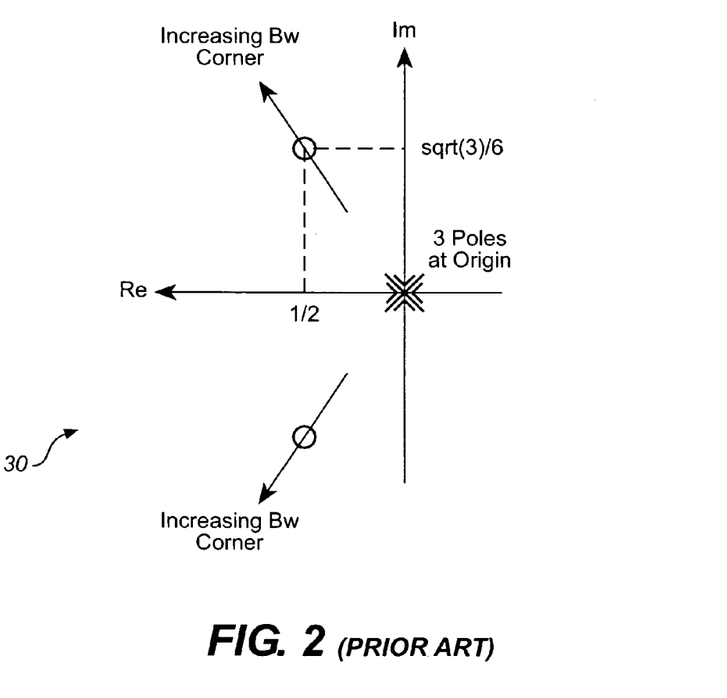
FIG. 2 is a prior art open loop pole-zero plot of (Eq. 8).
Figure 3:
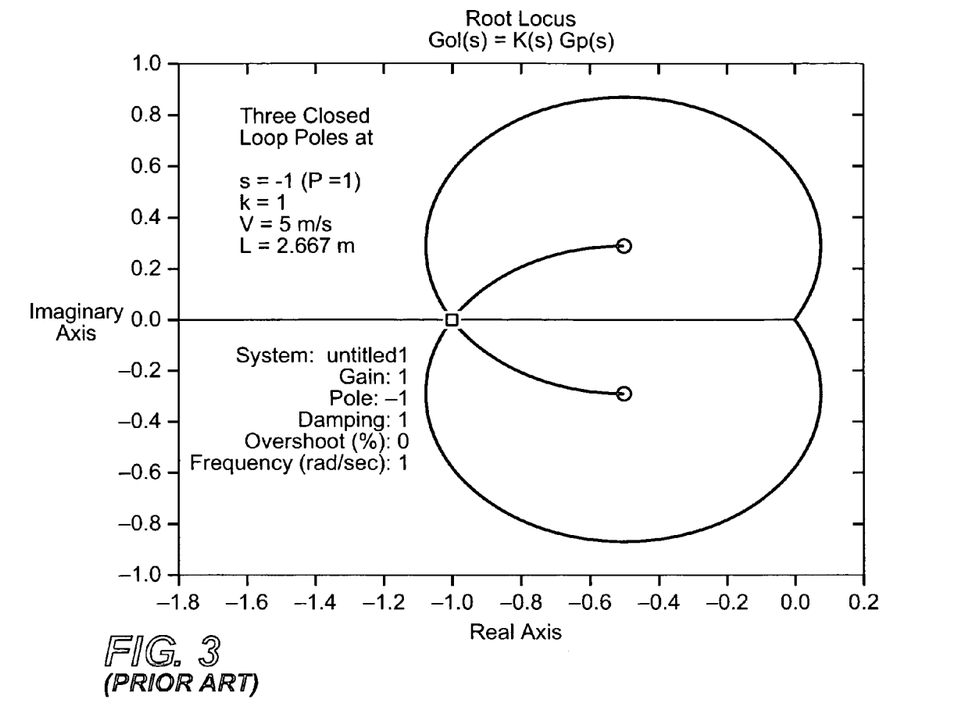
FIG. 3 is the root locus of the closed loop poles of the prior art system as k varies from zero to infinity.

FIG. 2 is the prior art open loop pole-zero plot 30 of (Eq. 8) and FIG. 3 is the prior art root locus 40 of the closed loop poles as k varies from zero to infinity. As expected, if k=1 all closed loop poles are at P=–1.

If the controller gains are fixed, and if the plant velocity is continually reduced to zero, the closed loop poles will migrate back into right half plane causing instability. Therefore, the prior art formulation of steering control breaks down under very low speed conditions. The only cure for this system that guarantees stability at very low speeds is to eliminate the integral control. That will adversely affect tracking performance to a significant degree.

In one embodiment of the present invention, a new method of position based control is realized by recognizing that the plant equations can be transformed out of the time domain into the spatial domain through a change of variables without loss of generality.

More specifically, in one embodiment, the method of the present invention of operating a vehicle at a substantially low speed based on change in said vehicle position comprises the following steps (not shown): (A) transforming a steering control algorithm into a substantially low speed (SLS) steering control algorithm, wherein said (SLS) steering control algorithm is configured to operate the vehicle in an asynchronous low speed mode; and (B) implementing the SLS steering control algorithm by a controller configured to operate the vehicle in the asynchronous low speed mode.

Substituting the vehicle velocity, Equation 9, into Equation 1 and Equation 2 yields a new set of state equations given by Equation 10 that describes the present invention. Note that vehicle velocity does not appear in the new set of state equations. All derivatives are now with respect to arc length.

$$V = \frac{dr}{dt} \quad \text{(Eq. 9)}$$

$$\begin{bmatrix} \frac{d\psi}{dr} \\ \frac{dy_{xte}}{dr} \\ \frac{dx}{dr} \end{bmatrix} = \begin{bmatrix} 0 & 0 & 0 \\ 1 & 0 & 0 \\ 0 & 1 & 0 \end{bmatrix} \begin{bmatrix} \psi \\ y_{xte} \\ x \end{bmatrix} + \begin{bmatrix} 1/L \\ 0 \\ 0 \end{bmatrix} \theta \quad \text{(Eq. 10)}$$

Here, $\psi$=heading error in (radians)

$y_{xte}$=cross track error (m)

L=distance between front and rear axles (m)

$\theta$=command input angle (radians)

As shown in Equation 11, the full state feedback is employed as the control law. Note that in Equation 11, the steering angle and other measured variables are a function of arc length (distance traveled) not time. Applying Ackerman's pole placement formula gives the new set of gains shown in Equation 12. These gains are identical to those derived in the prior art equations, but are not parameterized by vehicle velocity. To this point, there has been no loss of generality. Ackerman's formula, LaPlace transforms, and conventional stability criteria as it relates to the characteristic equation of the closed loop differential equation all still apply. The only change is that the pole locations are at P radians/meter.

$$\theta(r) = -K_1\psi(r) - K_2 y_{xte}(r) - K_3 x(r) \qquad \text{(Eq. 11)}$$

$$\underline{K} = [3PL\ 3P^2L\ P^3L] \qquad \text{(Eq. 12)}$$

In this embodiment of the present invention, the controller should be executed asynchronously at a fixed delta position in order to achieve the desired closed loop response. This is a fundamental departure from the prior art time-based method where the controller executes synchronously on a fixed time basis (e.g. 50 Hz).

In one embodiment of the present invention, Equation 13 is the position based definition of the LaPlace transform where arc length, r, is the integration variable. From this definition, the ZOH discrete equivalent of integration is given by Equation 14; thus, integration is carried out with respect to distance as opposed to time.

In one embodiment of the present invention, using this definition of s, the transfer function of the compensator is given by Equation 15.

$$L(f(r)) = \int_0^\infty f(r)e^{-sr}\,dr \qquad \text{(Eq. 13)}$$

$$\frac{1}{s} = \int dr \Rightarrow \frac{\Delta r}{z-1} \qquad \text{(Eq. 14)}$$

$$\theta(s) = -K_1\psi(s) - \left(K_2 + \frac{K_3}{s}\right)(y_{xte}(s) - y_{xte\_cmd}(s)) \qquad \text{(Eq. 15)}$$

Figure 4:
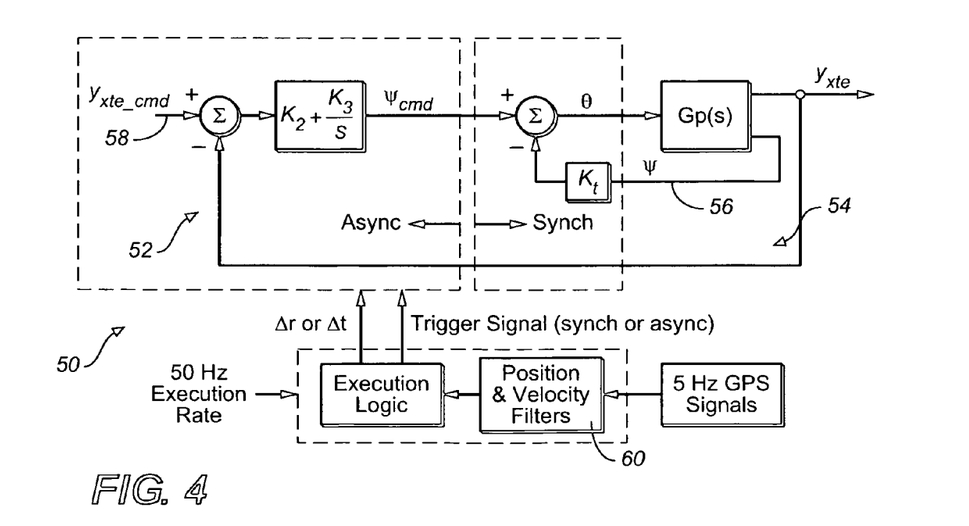
FIG. 4 depicts an asynchronous variable rate controller of the present invention.

In one embodiment, FIG. 4 depicts an asynchronous variable rate controller 50 of the present invention.

In one embodiment, the asynchronous variable rate controller 50 (of FIG. 4) further comprises two loops: an inner heading loop 54 that receives heading commands 56, and an outer XTE loop 52 that receives external commands 58 from an operator (i.e. nudge). This is a general implementation of the SLS steering control algorithm of the present invention in the low speed mode. a-8In one embodiment of the present invention, the SLS steering control algorithm is implemented as an asynchronous variable rate controller for front steered wheeled vehicles. In this embodiment of the present invention, the asynchronous variable rate controller 50 (of FIG. 4) comprises two loops: the inner heading asynchronous loop 54 that receives heading commands 56, and the outer cross track error asynchronous loop 52 that receives external cross track error commands 58 from an operator. This is a specific implementation of the SLS steering control algorithm of the present invention for front steered wheeled vehicles in the low speed mode.

In this embodiment of the present invention, the variable rate controller 50 (of FIG. 4) comprises an inner heading synchronous loop 54 that receives heading commands 56, and an outer cross track error asynchronous loop 52 that receives external cross track error commands 58 from an operator. In this embodiment of the present invention, the inner heading loop 54 is executed on a fixed time basis, whereas the outer cross track error loop 58 is executed on a position basis. This is a "mixed" mode asynchronous controller.

EXAMPLE I

Figure 4A:
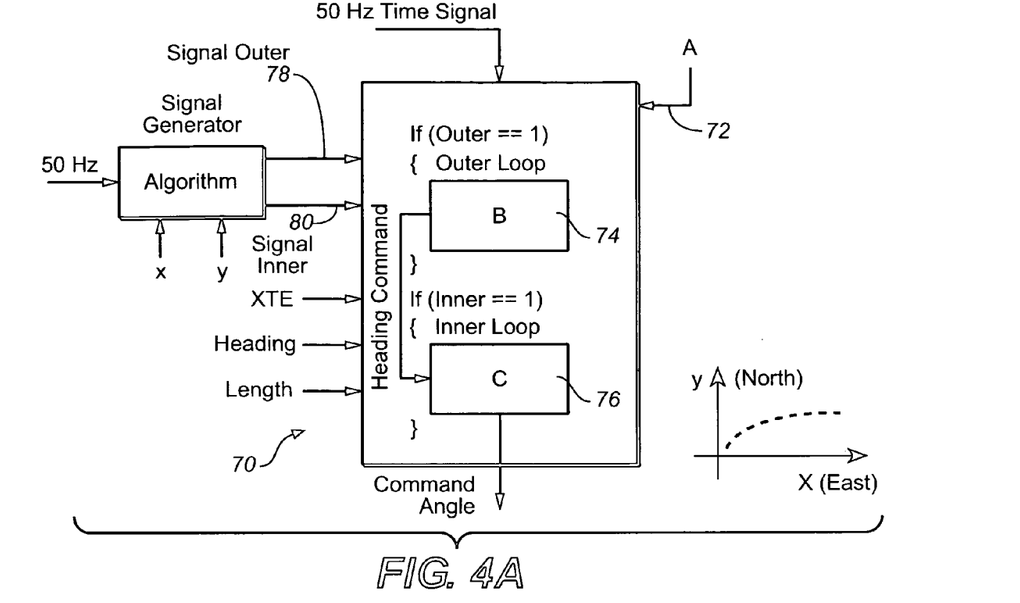
FIG. 4A illustrates an example of using a block of C source code to represent the operation of the asynchronous controller of the present invention.

FIG. 4A illustrates an example of using a block 70 of C source code (block A 72) to represent the operation of the asynchronous controller of the present invention. We assume that block A executes synchronously at 50 Hz. Block A is subdivided into two parts—block B (the outer loop 74) an block C (the inner loop 76). Block B only executes if the signal "outer" 78 is one. Similarly, block C only executes if the signal "inner" 80 is one. Therefore, at any given 50 Hz cycle, either B executes, C executes, or both execute. Thus, the signals "outer" and "inner" define the operational mode of the controller. On front steered wheeled vehicles, the signals "outer" and "inner" are always both one or zero. On tracked vehicle, the "inner" signal is always one, but the "outer" signal may or may not be one.

In the asynchronous mode (low speed mode), the velocity is normalized to one and the controller executes at each measurable change in position where $\Delta r \cong 10$ cm. For example, if $\Delta r = 10$ cm and $V = 0.1$ m/s, the controller executes at 1 Hz.

In one embodiment of the present invention, the asynchronous variable rate controller 50 (of FIG. 4) further comprises position & velocity filters 60 configured to substantially improve at least one parameter selected from the group consisting of: {removing noise; improving accuracy in obtained position and velocity coordinates; and smoothing out quantization effects}.

In one embodiment of the present invention, position & velocity filters 60 (of FIG. 4) are configured to assist in transitioning the asynchronous variable rate controller 50 (of FIG. 4) into and out of low speed mode.

In one embodiment of the present invention, the transition point is defined as a measured velocity less than 1 meter/sec. At V=1, the feedback gains of the controller in synchronous and asynchronous mode are matched; thus, the controller seamlessly transitions into and out of low speed mode with no operator intervention or notice.

If this is the case, the identical transient response (in terms of position) is achieved throughout the entire range of low speed operation. In addition, the ultimate closed loop stability is retained down to zero velocity. This is not possible with the prior art system. If the vehicle is not moving at all, the controller simply does not execute. Furthermore, tracking accuracy does not degrade as velocity is reduced because $\Delta r$ is chosen well outside the range of uncertainty of the GPS position measurement. Because $\Delta r$ is constant, the measurement uncertainty remains unchanged from one execution to the next regardless of velocity. Heading can also be estimated with greater accuracy than the GPS through Equation 16.

$$\psi = \frac{\Delta y_{xte}}{\Delta r}|\Delta r \cong 0.1 \qquad \text{(Eq. 16)}$$

EXAMPLE II

Figure 4B:
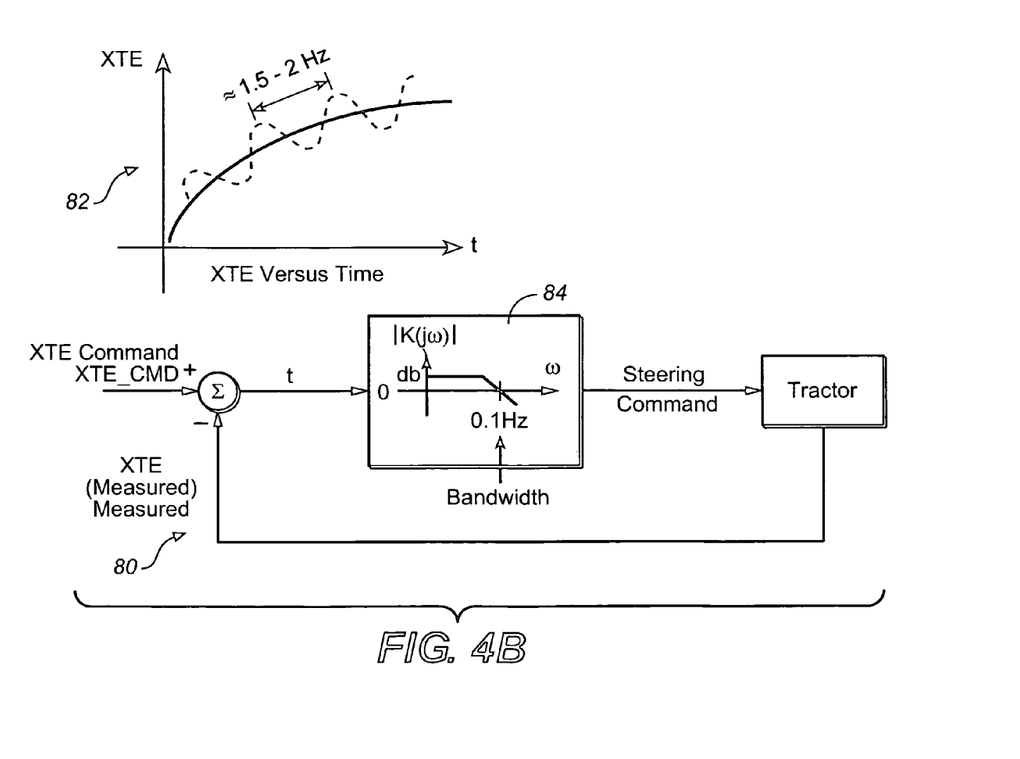
FIG. 4B is an example of the "controller bandwidth" that filters out the response of the controller to the higher frequencies.

FIG. 4B illustrates an example of the "controller bandwidth" that filters out the response of the controller to the higher frequencies. Because the bandwidth of the controller (0.1 Hz) is much less than the frequency of the roll induced oscillations (1.5-2) Hz, the controller will not respond to the roll induced oscillations that occur at higher frequencies (1.5-2) Hz.

Figure 5:
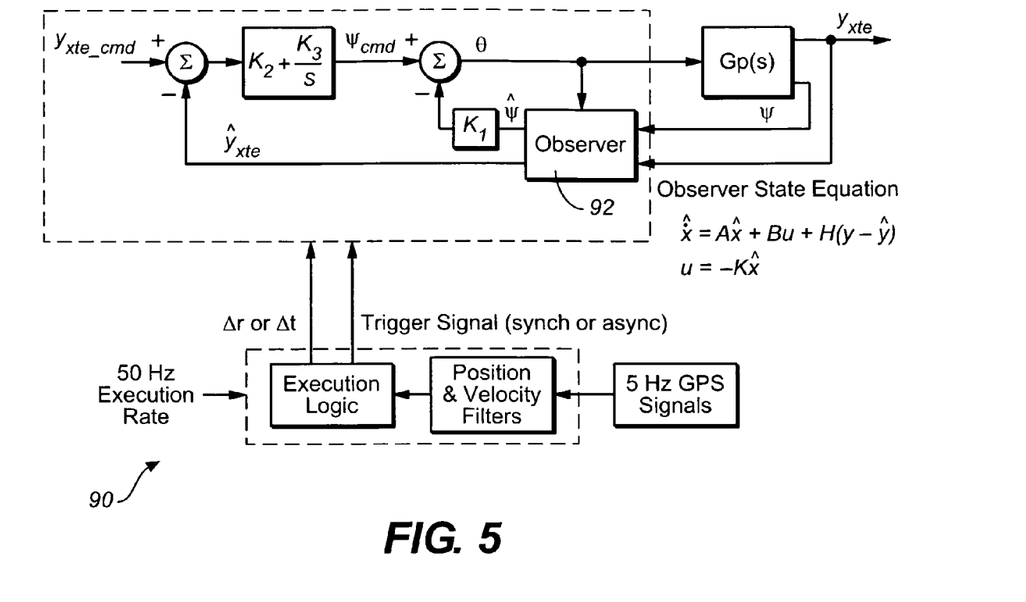
FIG. 5 shows the asynchronous variable rate controller of the present invention further comprising an "observer".

In one embodiment, FIG. 5 shows the asynchronous variable rate controller 90 of the present invention further comprising an "observer" 92 configured to improve the tracking accuracy of a vehicle being controlled. The observer 82 also executes asynchronously. In this embodiment of the present invention, the asynchronous observer is modeled according to the vehicle kinematics. Observer state equations are as follows:

$$X = A\hat{x} + Bu + H(y - \hat{y}) \quad \text{(Eq. 16A)}$$

$$u = -K\hat{x}$$

Figure 6:
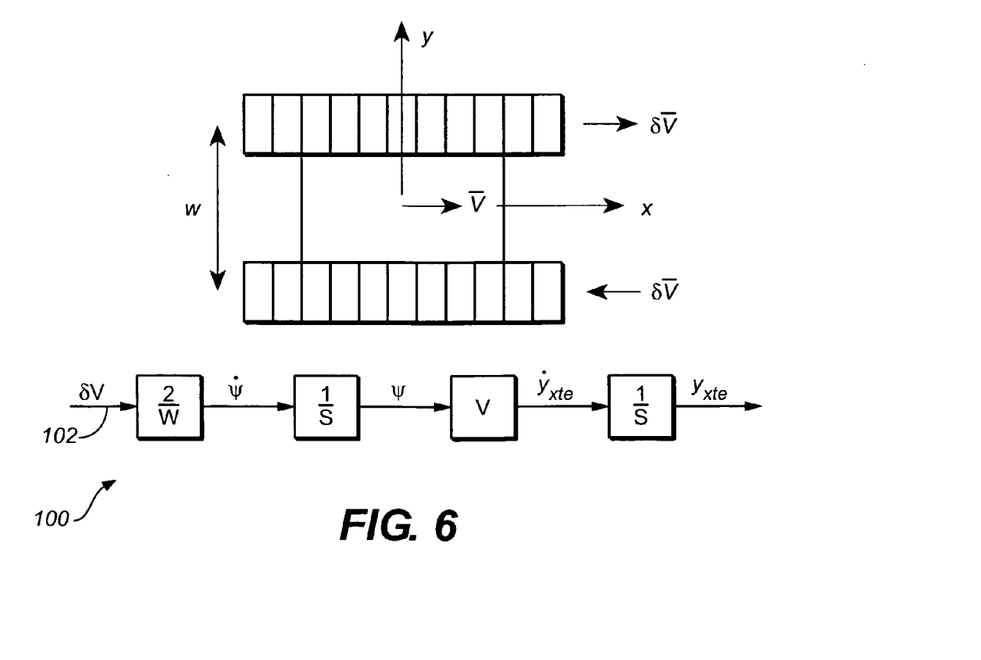
FIG. 6 is a diagram of the present invention that illustrates the kinematics of tracked vehicles.

In one embodiment of the present invention, FIG. 6 is a diagram 100 that illustrates the kinematics of tracked vehicles. The kinematic equations of motion in matrix form are also given in Equation 17. If this is the case, the command input 102 is a change in the relative velocities of the tracks, $\delta v$. From the state equations and the block diagram in FIG. 6, it is clear that heading is not a function of forward vehicle velocity. This is clear because a tracked vehicle can rotate about its center axis to any arbitrary heading without changing its position north or east. Consequently, a transformation of the heading state equation to arc length introduces a dependence on velocity that cannot be removed. The spatial transformation, however, does apply to the state equation for XTE because the vehicle kinematics still constrain the velocity vector to point in the same direction as heading. Even with tracked vehicles, a change in heading produces a corresponding change in XTE if the vehicle is moving. Although the velocity dependence remains, the effects can be mitigated. By executing the heading loop on a fixed time basis and the outer XTE loop on a position basis, temporal decoupling occurs as velocity is reduced to zero. In this case, closed loop stability and transient response becomes invariant to velocity. This can be observed by examining the closed loop transfer function of the system.

$$\begin{bmatrix} \psi \\ y_{xte} \\ x \end{bmatrix} = \begin{bmatrix} 0 & 0 & 0 \\ V & 0 & 0 \\ 0 & 1 & 0 \end{bmatrix} \begin{bmatrix} \psi \\ y_{xte} \\ x \end{bmatrix} + \begin{bmatrix} 2/W \\ 0 \\ 0 \end{bmatrix} \delta v \quad \text{(Eq. 17)}$$

Here, $\psi$ = heading error in (radians)

$y_{xte}$ = cross track error (m)

$V$ = vehicle velocity (m/s)

$W$ = track width (m)

$\delta v$ = heading rate command (radians)

$x$ = integral of cross track error (m sec)

Transforming the state equations given in Equation 17 to the spatial domain and applying full state feedback gives the following two equations.

$$\frac{d\psi}{dr} = \frac{2}{W} \frac{\delta v}{V} = \frac{2}{W} \frac{(-K_1 \psi - K_2 y_{xte} - K_3 x)}{V} \quad \text{(Eq. 18)}$$

$$\frac{d y_{xte}}{dr} = \psi \quad \text{(Eq. 19)}$$

Substituting Equation 19 into Equation 18 and simplifying gives Equation 20, which is the closed loop transfer function of the system.

$$G_{cl}(s) = \frac{y_{xte}(s)}{y_{xte\_cmd}(s)} = \frac{\frac{2K_3}{W}}{\left(Vs^3 + \frac{2K_1}{W}s^2 + \frac{2K_2}{W}s + \frac{2K_3}{W}\right)} \quad \text{(Eq. 20)}$$

In one embodiment of the present invention, if one takes the limit as velocity approaches zero, it is evident that the closed loop response and stability becomes invariant to velocity as shown in Equation 21. In this embodiment of the present invention, the outer loop should execute at a fixed incremental change in arc length, dr. As velocity increases, either the controller should revert back to time based execution to retain stability, or the gain of the inner loop should be increased to maintain temporal decoupling. Unlike wheeled vehicles, tracked vehicles can only operate with fixed gain position based control within the very low speed range. However, all the advantages of stability, tracking accuracy, and uniform response are retained.

$$G_{cl}(s) \mid V \to 0 = \quad \text{(Eq. 21)}$$

$$\lim_{V \to 0} \frac{\frac{2K_3}{W}}{\left(Vs^3 + \frac{2K_1}{W}s^2 + \frac{2K_2}{W}s + \frac{2K_3}{W}\right)} = K_3 / (K_1 s^2 + K_2 s + K_3)$$

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of operating a vehicle in a substantially low speed mode based on change of the position of said vehicle; in said substantially low speed mode said vehicle having speed less than 1 m/sec; said method comprising:
   (A) implementing a steering control algorithm by using a substantially low speed (SLS) steering control algorithm, wherein said (SLS) steering control algorithm is configured to operate said vehicle in an asynchronous low speed mode in the spatial domain;
   and
   (B) implementing said SLS steering control algorithm by a controller configured to operate said vehicle in said asynchronous low speed mode in said spatial domain.

2. The method of claim 1, wherein said step (A) further comprises the step of:
   (A1) transforming a set of state equations out of the time domain into the spatial domain, wherein a set of measured variables becomes a function of a distance traveled; wherein said set of measured variables is selected from the group consisting of: {a heading error; a cross track error; and a distance between front and rear axles}.

3. The method of claim 1, wherein said step (B) further comprises the step of:
- (B1) executing said SLS steering control algorithm in said spatial domain asynchronously at a fixed delta position to operate said vehicle at said substantially low speed.

4. The method of claim 3, wherein said step (B1) further comprises the step of:
- (B1, 1) implementing said SLS steering control algorithm by an asynchronous variable rate controller further comprising:
  - at least two loops comprising a first loop and a second loop; wherein said first loop comprises an inner heading loop that receives heading commands; and wherein said second loop comprises an outer cross track error loop that receives external cross track error commands from an operator.

5. The method of claim 3, wherein said step (B1) further comprises the step of:
- (B1, 2) implementing said SLS steering control algorithm by an asynchronous variable rate controller for front steered wheeled vehicles, said asynchronous variable rate controller further comprising:
  - at least two loops, wherein said first loop comprises an inner heading asynchronous loop operating in said spatial domain that receives heading commands; and wherein said second loop comprises an outer cross track error asynchronous loop operating in said spatial domain that receives external cross track error commands from an operator.

6. The method of claim 3, wherein said step (B1) further comprises the step of:
- (B1, 3) implementing said SLS steering control algorithm by a variable rate controller for tracked vehicles, said variable rate controller comprising at least two loops, wherein said first loop comprises an inner heading synchronous loop operating in the time domain that receives heading commands at equal time intervals; and wherein said second loop comprises an outer cross track error asynchronous loop operating in said spatial domain that receives external cross track error commands from an operator at each measurable change in said vehicle position.

7. The method of claim 3, wherein said step (B1) further comprises the step of:
- (B1, 4) implementing said SLS steering control algorithm by an asynchronous variable rate controller operating in said spatial domain further comprising:
  - at least two closed loops; wherein each said closed loop retains stability down to zero velocity.

8. The method of claim 3, wherein said step (B1) further comprises the step of:
- (B1, 5) implementing said SLS steering control algorithm by an asynchronous variable rate controller operating in said spatial domain; wherein the tracking accuracy of said vehicle does not substantially degrade as velocity is reduced.

9. The method of claim 1 further comprises the step of:
- (C) using an asynchronous observer operating in said spatial domain to improve the tracking accuracy of a vehicle being controlled, wherein said asynchronous observer conforms to said vehicle kinematics.

10. The method of claim 1 further comprising the step of:
- (D) using a position filter and a velocity filter to substantially improve at least one parameter selected from the group consisting of: {noise; position and velocity coordinates; and quantization effects}.

11. The method of claim 10, wherein said step (D) further comprises the step of:
- (D1) using said position and velocity filters to transition said controller from said asynchronous low speed mode operating in said spatial domain to a synchronous mode operating in said time domain and vice versa.

12. The method of claim 11, wherein said step (D1) further comprises the step of:
- (D1, 1) defining a transition point between said asynchronous low speed mode operating in said spatial domain and said synchronous mode operating in said time domain.

13. The method of claim 12, wherein said step (D1, 1) further comprises the step of:
- (D1, 1, 1) defining a transition point between said asynchronous low speed mode operating in said spatial domain and said synchronous mode operating in said time domain as a measured velocity that is less than a predetermined velocity.

14. The method of claim 11, wherein said step (D1) further comprises the step of:
- (D1, 2) matching the feedback gains of said controller in said synchronous and said asynchronous low speed modes.

15. An apparatus for operating a vehicle at a substantially low speed based on change in said vehicle position; in said substantially low speed mode said vehicle having speed less than 1 m/sec; said apparatus comprising:
- (A) a means for implementing a steering control algorithm by using a substantially low speed (SLS) steering control algorithm; wherein said (SLS) steering control algorithm is configured to operate said vehicle in said asynchronous low speed mode in the spatial domain; and
- (B) a means for implementing said SLS steering control algorithm by a controller configured to operate said vehicle in said asynchronous low speed mode in said spatial domain.

16. The apparatus of claim 15, wherein a means (A) further comprises:
- (A1) a means for transforming a set of state equations out of the time domain into the spatial domain, wherein a set of measured variables becomes a function of a distance traveled; wherein said set of measured variables is selected from the group consisting of: {a heading error; a cross track error; and a distance between front and rear axles}.

17. The apparatus of claim 15, wherein said means (A) further comprises:
- a processor; and
- a memory block;
  - wherein said processor is configured to transform a set of state equations out of the time domain into the spatial domain, wherein a set of measured variables becomes a function of a distance traveled; wherein said set of measured variables is selected from the group consisting of: {a heading error; a cross track error; and a distance between front and rear axles}.

18. The apparatus of claim 15, wherein said means (B) further comprises:
- (B1) a means for executing said SLS steering control algorithm asynchronously in said spatial domain at a fixed delta position to operate said vehicle at said substantially low speed.

19. The apparatus of claim 15, wherein said means (B) further comprises:
- a processor;
- and
- a memory block;
- wherein said processor is configured to execute said SLS steering control algorithm asynchronously in said spatial domain at a fixed delta position to operate said vehicle at said substantially low speed.

20. The apparatus of claim 18, wherein said means (B1) for executing said SLS steering control algorithm asynchronously at said fixed delta position to operate said vehicle at said substantially low speed further comprises:
- an asynchronous variable rate controller comprising at least two loops, wherein said first loop comprises an inner heading loop that receives heading commands; and wherein said second loop comprises an outer cross track error loop that receives external cross track commands from an operator.

21. The apparatus of claim 15 further comprising:
- a position filter and a velocity filter configured to substantially improve at least one parameter selected from the group consisting of: {noise; position and velocity coordinates; and quantization effects}.

22. The apparatus of claim 15 further comprising:
- an asynchronous observer operating in said spatial domain configured to improve the tracking accuracy of a vehicle being controlled, wherein said asynchronous observer conforms to said vehicle kinematics.

23. A computer-readable storage medium useful in association with a radio navigation chip, said chip having a processor and memory, said chip is configured to operate a vehicle at a substantially low speed based on change in the position of said vehicle; in said substantially low speed mode said vehicle having speed less than 1 m/sec; said computer-readable storage medium including computer-readable code instructions configured to cause said processor to execute the steps of:
- (A) implementing a steering control algorithm by using a substantially low speed (SLS) steering control algorithm, wherein said (SLS) steering control algorithm is configured to operate said vehicle in said asynchronous low speed mode in the spatial domain;
- and
- (B) implementing said SLS steering control algorithm by a controller configured to operate said vehicle in said asynchronous low speed mode in said spatial domain.

24. A computer program product that includes a computer-readable medium having a sequence of instructions which, when executed by a processor, causes the processor to execute a process for operating a vehicle at a substantially low speed based on change in position of said vehicle; in said substantially low speed mode said vehicle having speed less than 1 m/sec; the process comprising:
- (A) implementing a steering control algorithm by using a substantially low speed (SLS) steering control algorithm, wherein said (SLS) steering control algorithm is configured to operate said vehicle in said asynchronous low speed mode in the spatial domain;
- and
- (B) implementing said SLS steering control algorithm by a controller configured to operate said vehicle in said asynchronous low speed mode in said spatial domain.

* * * * *